Oct. 21, 1958   E. N. COLE   2,857,131

FLOW MODULATING VALVE

Filed Nov. 25, 1955

INVENTOR
Edward N. Cole
BY J. W. Lovett
ATTORNEY

United States Patent Office 2,857,131
Patented Oct. 21, 1958

2,857,131

FLOW MODULATING VALVE

Edward N. Cole, Detroit, Mich., assignor to General Motors Corporation, Detroit, Mich., a corporation of Delaware Application November 25, 1955, Serial No. 548,913

3 Claims. (Cl. 251—210)

This invention relates to valves and more particularly to valves for modulating and controlling the flow of fluid in systems such as employed in heating automotive vehicles.

Heating systems for automobiles conventionally depend upon hot water from the engine cooling system as the heating medium. The water is circulated through a heater core in accordance with the setting of a valve controlling the flow and, hence, the temperature of the core. The valve setting is determined by manual or automatic means such as a hand lever or a temperature sensitive mechanism respectively connected to the valve and actuated in accordance with the temperature of the air within the passenger compartment. Heretofore, such valves have been characterized by a tendency to impart a hunting or surging effect upon the flow of the heating medium.

One object of the present invention is to provide an improved valve of simple structure which is capable of shutting off the flow positively and operating smoothly and effectively in positions intermediate its fully opened and fully closed positions.

To these ends, a feature of the invention resides in the combination of a shutoff member and a yielding member connected together to control a valve port with the yielding member being effective in intermediate positions of the valve. Another feature is a yielding cup member mounted on a movable support and having a marginal surface lying in a plane inclined to a seat surrounding the port of a valve when the latter is open.

These and other important features of the invention will now be described in detail in the specification and then pointed out more particularly in the appended claims.

Figure 1:
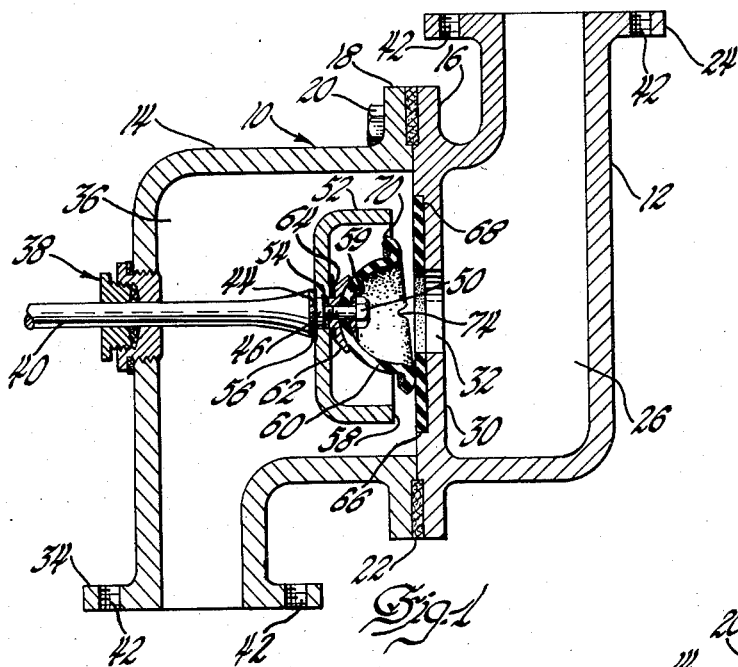
Fig. 1 is a sectional view of a valve structure in which the present invention is embodied with the valve placed in a position intermediate its fully open and closed positions.

In the drawings the valve structure generally indicated at 10 comprises two valve body portions 12 and 14. These portions are flanged as at 16 and 18 for attachment as by means such as the bolt 20. Only one bolt is shown but, of course, several are employed. A gasket 22 is interposed between the flanges. The body portion 12 is in the form of a pipe elbow with an end flange 24 and a chamber 26. It is also provided with a wall 30 lying in the plane of the flange 16 and pierced by a port 32 communicating with the chamber 26. The portion 14 has an end flange 34 and is also in the form of an elbow with an L-shaped chamber 36. The wall of the portion 14 is provided with a stuffing box arrangement 38 which is coaxial with the port 32 and serves as a support for a slidable stem 40. The flanges 24 and 34 bear threaded holes 42 by means of which bolts may be employed to connect the assembly in a system such as a heating system of an automobile in which hot water is circulated.

The stem 40 is enlarged at one end to present a shoulder 44 surrounding a cylindrical centering boss 46. This end of the stem is also axially bored and threaded as at 48 to receive a bolt 50. A rigid cup or valve member 52 is centrally bored as at 54 to accommodate the boss 46. Interposed between the shoulder 44 and the cup 52 is a gasket or washer 56. The marginal surface 58 of the cup 52 is adapted to engage a valve seat as will further appear.

Between the head of the bolt 50 and the cup 52 are mounted a washer 59, a yielding cup or member 60, a recessed washer 62 and a sealing washer 64. The bolt 50 serves to hold those parts axially in fixed relation on the stem 40 with the cylindrical portion of the cup 52 surrounding the member 60.

The wall 30 is recessed as at 66 around the port 32 to receive a valve seat material 68 fixed thereto. If desired, the edge of the recess may be swaged or crimped inwardly to hold the material 68 in place, but other means may be employed for this purpose.

The cup or member 60 is made of resilient and yielding material and is depicted in the drawings as being made of rubber. It is to be understood, however, that the cup may be made of thin copper, brass or steel or of a suitable plastic depending upon the specific use to which the device is to be applied. For controlling the hot water heating system of an automobile, thin spring steel is satisfactory. It is essential, however, that the member 60 yield or be deformable and sufficiently resilient to regain its original shape after distortion.

The original, normal or undistorted shape of the member 60 may be modified substantially without departing from the spirit of the present invention. The drawings depict the member as semi-spherical with an outturned reversely curved marginal flange 70. Conveniently, this cup structure is made and depicted as a symmetrical element but with a hole 72 eccentrically placed to receive the bolt 50. Upon assembly of the parts, the cup 60 nests snugly within the recess of the washer 62 and presents an annular marginal surface facing the seat material 68. This marginal surface lies in a plane inclined to the surface of the material 68 when the valve is partially open as shown in Fig. 1. If desired, the member or cup 60 may be asymmetric to result in the desired inclination of the facing surfaces of the member and the material 68.

In some uses it is desirable to eliminate the possibility of the valve shutting off completely and, with this end in mind, the cup is provided with a radial groove 74 constituting a permanent bleed.

In operation, the stem 40 is operated either manually or by a temperature sensitive device. When no or a minimum flow of fluid through the valve is desired, the stem is caused to force the surface 58 of the cup 52 into seating engagement with the material 68. At this time the inner cup 60 will be distorted and serve as a secondary seal or closure except for the possible inclusion of the groove or bleed 74.

Figure 2:
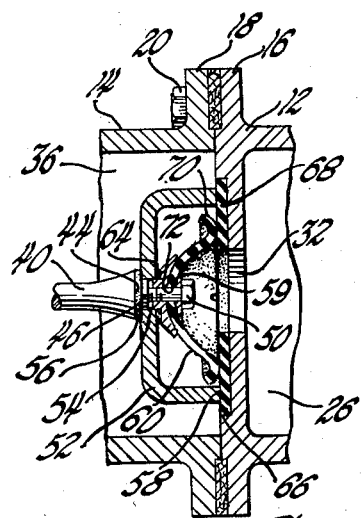
Fig. 2 is a sectional view of a portion of the structure shown in Fig. 1 with parts illustrated in their valve closing positions.
Figure 3:
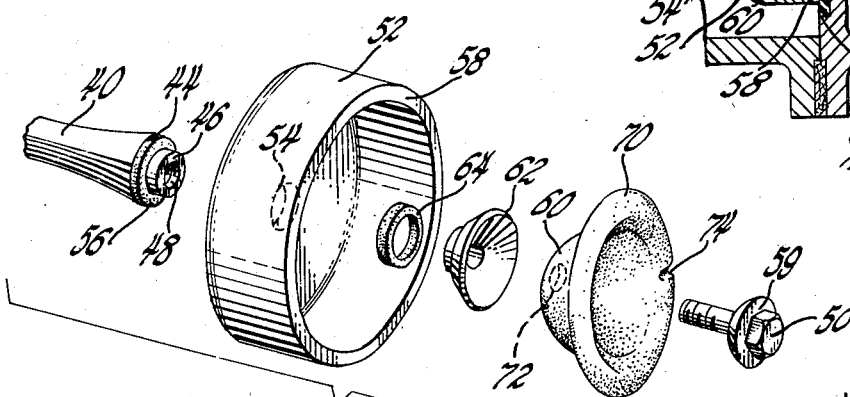
Fig. 3 is an exploded and perspective view of the movable parts shown in Figs. 1 and 2.

When flow from the chamber 26 through the port 32 into the chamber 36, or vice versa, is desired or when heat is desired as in the use of an automotive heating system, the stem 40 is moved to the left from its position as viewed in Fig. 2. The cup 52 first leaves its seat. Flow control is then solely controlled by the cup 60. The bleed 74, if used, assures some circulation even though the cup 60 is fully seated after the cup 52 is unseated.

With a further movement of the stem 40 to the left, the cup 60 begins to regain its original form and, in so doing, an arcuate space between the previously contacting or seated surfaces begins to form and gradually enlarges as the stem is moved. This continues until the cup 60 leaves the material 68 in its undistorted form and the valve is fully open. In closing the valve by moving the stem 40 to the right, the reverse action takes place with smoothness in its effect upon the fluid until the cup 52 again seats around its margin and positively cuts off the flow.

The yielding and resilient nature of the cup or member 60 gives rise to a spring action which modifies the effect of the valve on the fluid. As a result, changing of the rate of flow through the valve is modified or "cushioned" to give a minimum of hunting or surging. It will be noted that if the bleed 74 is used, it will be cleansed of any deposits therein each time the valve opens.

I claim:

1. A valve comprising a valve body having an inlet passage and an outlet passage and defining a seat provided with a port connecting said passages, an imperforate rigid member and an imperforate resilient cup shaped member mounted within said rigid member, said members having diameters greater than that of said port, means mounting said members for movement to a seated position around said port in which position said resilient member is distorted and sealingly engages said seat and wherein said rigid member sealingly engages said seat, and to an unseated position away from said port at which position said resilient member regains its original form, said resilient member in its unseated and original, undistorted form having a seating surface that is inclined to and facing that portion of said body defining said port.

2. A valve as defined in claim 1 wherein a radial groove constituting a bleed passage is provided in the seating surface of said resilient member.

3. A valve comprising a valve body defining a seat provided with a port connecting inlet and outlet passages, an imperforate cup member and an imperforate resilient cup-shaped member presenting seating surfaces, said resilient member being asymmetrically supported within said cup member, said members being symmetrically preformed, a longitudinally movable stem supporting said members and adapted to move them toward said port for sealingly seating said surfaces around said port, and said resilient member being distorted from its free symmetrical shape to a greater extent at one side of said port than at the other by constraining contact with said body around the periphery of said port.

References Cited in the file of this patent

UNITED STATES PATENTS

| | | |
|---|---|---|
| 1,764,181 | Raetz | June 17, 1930 |
| 2,403,028 | Smith | July 2, 1946 |
| 2,403,777 | Yanka | July 9, 1946 |